Nov. 2, 1965   J. S. MONTGOMERY ETAL   3,215,010
TONG DIE
Filed Jan. 25, 1962   2 Sheets-Sheet 1
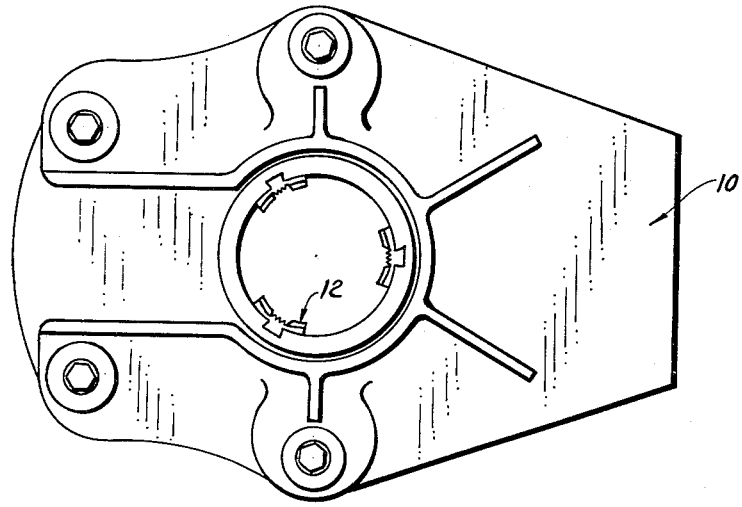
Fig. 1
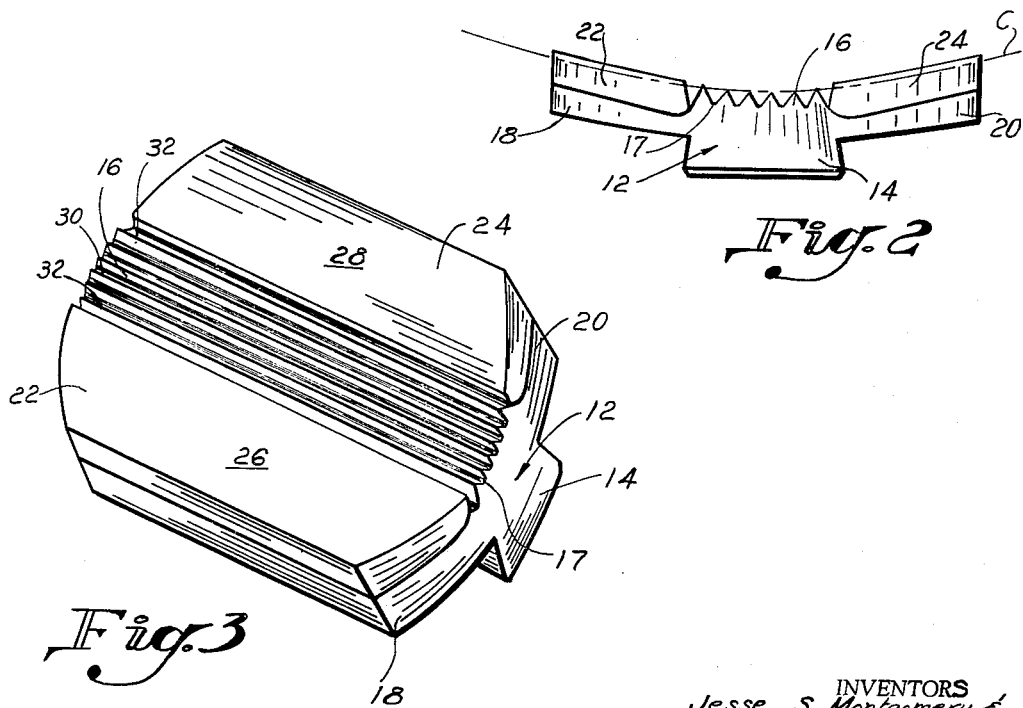
Fig. 2
Fig. 3
INVENTORS
Jesse S. Montgomery &
William C. Hutton
BY
William S. Dorman Nov. 2, 1965   J. S. MONTGOMERY ETAL   3,215,010
TONG DIE
Filed Jan. 25, 1962   2 Sheets-Sheet 2

INVENTORS
Jesse S. Montgomery &
William C. Hutton
BY
William S. Dorman

United States Patent Office 3,215,010
Patented Nov. 2, 1965

3,215,010
TONG DIE
Jesse S. Montgomery and William C. Hutton, Oklahoma City, Okla., assignors, by mesne assignments, to Montgomery Drilling Company, Oklahoma City, Okla., a partnership
Filed Jan. 25, 1962, Ser. No. 168,703
10 Claims. (Cl. 81—186)

This application is a continuation-in-part of our copending application Serial No. 7,208, filed February 8, 1960, and entitled "Tong Die," now abandoned.

This invention relates to improvements in gripping or clamping tongs, and more particularly, but not by way of limitation, to improved tong die elements such as utilized with pipe tongs, and the like, in the oil industry.

In the drilling of an oil well bore, or the like, pipe tongs are normally utilized at the surface of the well for gripping the pipe during the threading of two pipe sections together, as well as for many other operations. The tongs are usually provided with a plurality of die elements having a plurality of serrations or teeth thereon for biting into the outer periphery of the pipe. The initial shock of the tong dies striking the pipe, in combination with the penetration of the teeth into the pipe, frequently seriously mar or damage the pipe, which is a disadvantage of present day die elements. In addition, the pipe being rotated by the tongs stops very abruptly when the two pipe sections "shoulder up" or become fully connected at the threaded joint, and the teeth of the die elements often over-run the rotation of the pipe, further scarring the periphery of the pipe due to die slippage.

The present invention contemplates a novel tong die element wherein rubber spacers are provided to contact the pipe upon actuation of the tongs therearound, thus cushioning the initial shock. The rotation or "spin up" of the pipe may be accomplished with a lower gripping pressure, particularly with hydraulically actuated power tongs, whereby only the rubber bears against the pipe during the rotation thereof for making up the threaded connection. Thus, when the pipe rotation stops abruptly, the rubber will slide along the outer periphery of the pipe without damage thereto. However, for an actual biting grip on the pipe, the gripping pressure of the tongs may be increased sufficiently for the teeth of the die elements to be brought into contact with the outer periphery of the teeth and bite into the pipe. The novel die element is so designed and constructed as to provide a uniformity of bite, and to increase the load distribution, thus providing a more effective force with less damage to the pipe.

It is an important object of this invention to provide an improved die element for gripping tongs.

It is another object of this invention to provide a novel die element wherein the initial shock of the teeth thereof is cushioned upon actuation of the tongs.

Another object of this invention is to provide a novel die element wherein damage to the gripped object is substantially reduced.

A further object of this invention is to provide a novel die element for gripping tongs wherein the load distribution of the tongs is increased to provide a more effective force.

A still further object of this invention is to provide a novel die element for gripping tongs which is simple and efficient in operation and economical and durable in construction.

Other and further objects and advantageous features of the present invention will hereinafter more fully appear in connection with a detailed description of the drawings in which:

FIGURE 1 is a plan view of a gripping tong provided with die elements embodying the invention.

FIGURE 2 is an end elevational view of a die element embodying the invention.

FIGURE 3 is a perspective view of a die element embodying the invention.

Figure 4:
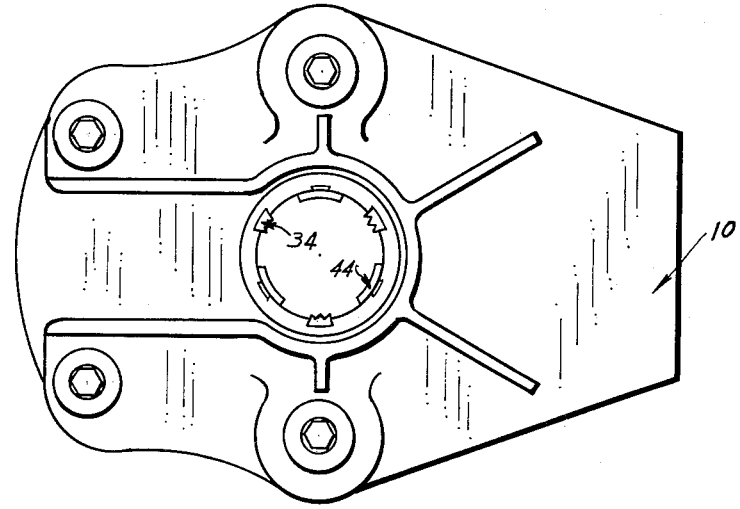
FIGURE 4 is a view similar to FIGURE 1 showing a modified form of the die elements provided in the gripping tong.

Referring to the drawings in detail, reference character 10 refers in general to any suitable gripping tong mechanism, such as a pipe tong, or the like, adapted for receiving a plurality of spaced die elements 12. The tong apparatus 10 is operable to alternate open and closed positions whereby the die elements 12 may be alternately positioned adjacent the outer periphery of a pipe section (not shown), or the like, for securely gripping the pipe, as is well known.

The die element 12 preferably comprises an elongated body portion 14 having a substantially trapezoidal cross-sectional configuration complementary to the dove tail recess (not shown) normally provided in the tongs 10 for receiving the die 12. The configuration of the body 14 cooperates with the dove tail groove in the tongs 10 for securely retaining the die elements 12 wedged in position thereon, as is the common practice in the art. A plurality of transversely spaced teeth 16 extend longitudinally throughout the length of the body 14. The teeth 16 are preferably substantially triangular shaped in cross-sectional configuration, but not limited thereto, and a flat area 17 may be provided between each of the teeth 16, if desired. A pair of longitudinally extending shoulder portions or flanges 18 and 20 are provided on the opposed outer edges of the body 14 for receiving a pad or spacer member 22 and 24, respectively, thereon. The flanges 18 and 20 are preferably slightly tapered, or arcuate in transverse configuration whereby the die element 12 will conform substantially to the configuration of the outer periphery of a section of the pipe to be gripped in the tongs 10, as will be hereinafter set forth.

The pads or spacers 22 and 24 are substantially identical and may be constructed from any suitable compressible material, such as rubber, or the like, and are secured to the respective flanges 18 and 20 by bonding, or the like (not shown). The exposed or outer surfaces 26 and 28 of the pads 22 and 24 are preferably tapered or arcuate in transverse configuration and cooperate with the generally angular or arcuate configuration of the flanges 18 and 20 to conform to the circular configuration of the pipe for facilitating the gripping of the outer periphery thereof. In addition, each pad 22 and 24 preferably extends longitudinally throughout the length of the body 14, as clearly shown in FIGURE 3, and is of a thickness greater than the overall depth of the teeth 16 whereby the exposed surfaces 26 and 28 thereof project above the upper or outer limit of the teeth 16. Thus, the rubber pads or spacers 22 and 24 will contact the pipe or other object to be gripped prior to contact of the teeth 16 therewith.

It is preferable that the height of the inwardly disposed teeth 16 be less than the height of the outermost teeth 16 whereby the crests 30 thereof will be slightly lower in diminishing sequence than the crests 32 of the outermost teeth 16. The varied heights of the teeth determine a circle C (FIGURE 2) in order to compensate for the curvature of the pipe being gripped by the tongs 10, as will be hereinafter set forth. This will assure that the load will be evenly distributed throughout the plurality of teeth 16, and will provide a uniformity of bite.

It is to be noted that while six longitudinally extending teeth 16 are depicted herein, there is no intention of limiting the number of teeth to any specific number. In addition, the pads 22 and 24 may comprise a plurality of spaced pads on the flange 18 and 20, if desired, in lieu of the unitary elongated pads depicted herein. Furthermore, the triangular configuration of the teeth 16 may be varied without departing from the spirit of the invention.

*Operation*

A plurality of the die elements 12 may be disposed in the tongs 10 in any well known manner, such as tightly wedging the elements 12 into the dove tail recesses (not shown) provided on the tongs in such a manner that the opposed flanges 18 and 20 are disposed adjacent the inner periphery of the tongs, as clearly shown in FIGURE 1. The die elements are usually driven into the recesses by hammering, or the like, and may be removed, if desired, by driving the elements out of the recesses in a similar manner. Thus, the die elements 12 may be replaced in the event they become worn or otherwise damaged.

With the die elements 12 securely in position on the tongs, the tongs may be utilized in the usual manner for gripping pipe, or the like (not shown). Upon actuation of the tongs to a closed or clamped position around the pipe, the rubber pads or spacers 22 and 24 are brought into contact with the outer periphery of the pipe prior to contact of the teeth 16 thereagainst. Thus, the initial shock of the tongs agains the pipe is cushioned or greatly reduced. This is of particular importance in the event that the tongs are power actuated. As hereinbefore set forth, the outer surfaces 26 and 28 of the spacers 22 and 24 are preferably arcuate to substantially conform to the circular configuration of the outer periphery of the pipe. Thus, the contact between the pads 22 and 24 provide a frictional gripping of the pipe engaged thereby.

If the tongs 10 are being utilized for rotating the pipe in order to threadedly connect a pair of adjoining pipe sections, it is possible to use a clamping pressure only sufficient to provide the friction holding of the pipe by the pads 22 and 24 during the rotation of the pipe. Thus, when the two pipe sections "shoulder up" or reach a substantially fully threaded connection, and the pipe being rotated stops abruptly, the rubber pads 22 and 24 will slide around the outer periphery of the pipe without marring or otherwise damaging the surface thereof. In order to further tighten the threaded connection, or in the event that a greater pressure is required for any reason, the pressure of the tongs 10 against the pipe may be increased whereby the pads 22 and 24 will be compressed against the respective flanges 18 and 20, and the teeth 16 will be brought into contact with the outer periphery of the pipe. The crests 30 and 32 of the teeth 16 will bite into the pipe for securely holding the pipe within the tongs 10.

As hereinbefore set forth, it is preferable that the crests 30 of the innermost rows of teeth 16 be of a diminishing height or shorter than the crests 32 of the outermost teeth 16. Thus, in use with a pipe having an outer circumference approximately the same size as the circle C established by the crests of the teeth, as shown in FIGURE 2, all of the teeth 16 will come into contact with the outer periphery of the pipe substantially simultaneously. This precludes an excessive stress on any one tooth, and distributes the load evenly over the entire gripping area of the die element 12, as well as assures that all of the teeth 16 will penetrate or bite into the pipe substantially the same depth. In the event the outer circumference of the pipe is larger than the circle C, the outer teeth 16 will contact the pipe first, and there will be less penetration of the outer teeth before the inner teeth bite into the pipe than is required with the conventional die elements. In the event that the pipe circumference is smaller than the circle C, the inner teeth 16 will bite into the pipe first, but here again, the penetration of the inner teeth 16 will be less before the outer rows of teeth bite into the pipe than is required with the normal die element of today. Thus, the load distribution of the gripping operation is more evenly distributed throughout the teeth, and a shallower penetration of the pipe is required with a resultant lessening in damage to the pipe. Furthermore, the die element 12 may be efficiently utilized with a variety of pipe diameters, thus providing a more universal adaptation for the tongs 10.

*Modified die elements*

Figure 5:
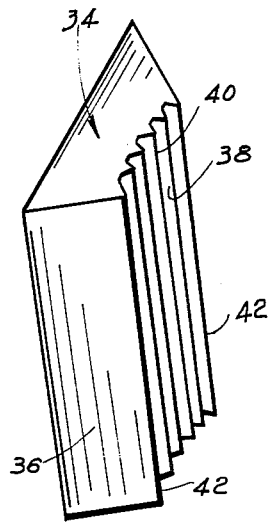
FIGURE 5 is a perspective view of still another modified form of die element.

Referring to FIGURE 5, a die element 34 is depicted comprising an elongated body portion 36 having a substantially trapezoidal cross-section configuration complementary to the dove tail recess (not shown) provided in the tongs 10 for receiving the die 34, as hereinbefore set forth. A plurality of transversely spaced teeth 38, similar to the teeth 16, extend longitudinally throughout the length of the body 36. The height of the inwardly disposed teeth 38 are preferably less than the height of the outermost teeth 38, as set forth in the preferred embodiment, whereby the crests 40 thereof will be slightly lower in diminishing sequence than the crests 42 of the outermost teeth 38. The varied heights of the teeth determine a circle (not shown), as set forth in the preferred embodiment, in order to compensate for the curvature of the pipe being gripped by the tongs 10, as hereinbefore set forth. This will assure that the load will be evenly distributed throughout the plurality of teeth 38, and will provide a uniformity of bite. A plurality of the die elements 34 may be secured to the tongs in lieu of the die elements 12, if desired, when it is preferable to provide only a biting engagement between the teeth 38 and the outer periphery of the pipe. In addition, the die elements 34 may be utilized in conjunction with a plurality of die elements 44 as will be hereinafter set forth.

Figure 6:
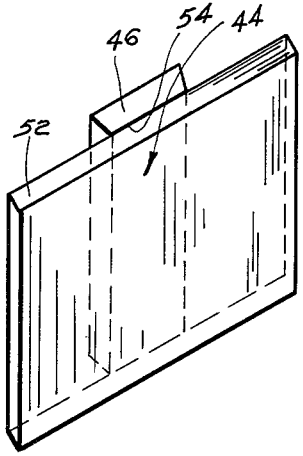
FIGURE 6 is a perspective view of another modified die element.
Figure 7:
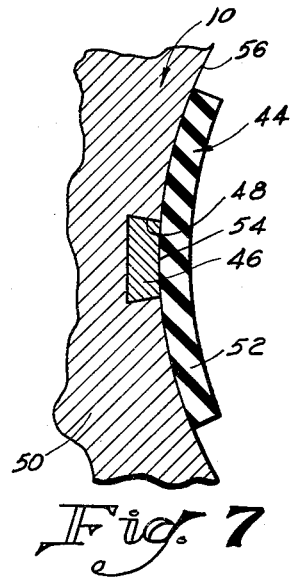
FIGURE 7 is a sectional plan view of the die element depicted in FIGURE 6 and shown in a tong body.

Referring now to FIGURES 6 and 7, the modified die element 44 comprises an elongated body or holder portion 46, preferably of a substantially trapezoidal cross-sectional configuration complementary to a dove tail recess 48 (FIGURE 7) normally provided in the body 50 of the tongs 10. A flexible rubber pad 52 is suitably bonded at 54 to the body 46, and is preferably of a greater width than the holder portion 46, as clearly shown in the drawings. It will be apparent that any suitable material may be utilized in lieu of rubber, if desired.

The friction between the rubber pad 52 and the outer periphery of the pipe is sufficient, in many instances, for supporting the pipe in the tongs, and it may be desirable to utilize only the die elements 44 in the tongs 10. In this instance, the die elements 44 may be secured in the tongs in lieu of the die elements 12. The body 46 may be disposed in the recess 48 by tightly wedging the body therein, as set forth hereinbefore in the operation of the preferred embodiment. The inner edge or inner periphery 56 of the tong body 50 is normally of an arcuate configuration complementary to the outer periphery of the pipe to be supported thereby. The flexibility of the pad 52 permits the pad to conform to the arcuate configuration of the inner periphery of the body 50, as shown in FIGURE 7. Thus, the pad 52 will fit snugly against the pipe when the tongs 10 are clamped therearound. The rubber pad will greatly reduce the initial shock of the tongs against the pipe as they are moved into the clamping position therearound. The friction between the pad 52 and the outer periphery of the pipe will hold the pipe securely within the tongs for substantially any desired operation. In addition, the friction between the pad 52 and the inner periphery of the body 50 facilitates the holding of the die 44 within the tongs 10. This type of die element completely eliminates the use of teeth or serrations in installations wherein the frictional engagement of the pipe is sufficient, thus precluding any damaging or marring of the pipe. The substantially enlarged contact area or surface of the pad 52 which is disposed adjacent the outer periphery of the pipe in the clamped position of the tongs 10 assures that sufficient friction will be provided for securely supporting the pipe in the tongs.

Referring now to FIGURE 4, the tongs 10 are depicted with a plurality of spaced die elements 34 secured therein with the die elements 44 interposed therebetween. This arrangement may be utilized in conditions wherein the combined frictional and biting engagement of the pipe is desired as set forth in the preferred embodiment. It is to be noted that the thickness of the pad 52 of the die elements 44 is substantially thicker than the overall depth of the teeth 38 of the die elements 34 whereby the pads 52 project inwardly a greater distance than the teeth 38. Thus, when the clamping pressure is initially applied to the tongs 10, the pads 52 are brought into contact with the outer periphery of the pipe for cushioning or reducing the shock to the pipe. The frictional engagement of the pads 52 with the outer periphery of the pipe may be utilized for the "make-up" connection of the threaded joint between two tandem pipe sections. When the pipe sections "shoulder up" at the threaded connection, the pads 52 will slide or ride along the surface of the pipe without damaging or marring the outer periphery thereof. If additional gripping pressure is desired, a greater force may be applied to the tongs, as is well known, whereby the pads 52 will be compressed, and the teeth 38 of the die elements 34 will bite into the pipe. The biting engagement of the teeth will permit a further tightening of the threaded joint, as hereinbefore set forth. The varying heights of the crests of the teeth 38 provide for an even load distribution on the teeth to prolong the useful life of the die element and provide more efficient results.

It will be apparent that the die elements 12, 34 and 44 may be held in the tongs 10 in any suitable manner, and are not limited to being wedged therein. It may be desirable to provide a plurality of spaced threaded apertures (not shown) in the body portions of the die elements for receiving suitable screws (not shown) whereby the die elements may be removably secured to the tongs by means of the screws, or the like.

From the foregoing, it will be apparent that the present invention provides a novel die element for pipe gripping tongs, and the like, wherein marring or damaging of the outer periphery of the object being gripped is greatly reduced. In addition, the rubber spacers or pads provided on the die elements cushion the initial shock upon actuation of the tongs and provide a frictional contact with the gripped object in lieu of a biting contact for certain operations of the tongs. Furthermore, the height of the teeth of the die element are varied in order that the load carried by the tongs will be more evenly distributed throughout the teeth for a longer useful life for the die element. The friction between the rubber gripping surface and the metallic pipe may be utilized for supporting the pipe with a complete elimination of teeth, if desired. The novel die element is simple and efficient in operation and economical and durable in construction.

Whereas, the present invention has been described in particular relation to the drawings attached hereto, it should be understood that other and further modifications, apart from those shown or suggested herein, may be made within the spirit and scope of this invention.

What is claimed is:

1. A tong die comprising
a body portion,
a plurality of exposed teeth provided on one face of the body portion to provide a biting engagement with an object upon operation of the tong,
and a plurality of rubber spacers secured to the body whereby the teeth are interposed therebetween and said spacers extending beyond the crests of the teeth for cushioning the initial shock of the engagement of the teeth with the object.

2. A tong die comprising
an elongated body portion,
a plurality of transversely spaced exposed teeth provided on one face of the body portion and extending longitudinally therealong,
and a plurality of compressible spacer members secured to the body whereby the teeth are interposed therebetween and said spacer members extending beyond the limit of the height of the teeth.

3. A tong die comprising
an elongated body portion having oppositely tapered side edges to provide a substantially dove-tail configuration therefor,
a plurality of longitudinally extending rows of teeth provided on one face of the body portion and disposed substantially parallel with the opposed side edges of the body portion,
said teeth of varying heights to compensate for the curvature of the outer periphery of the pipe,
and the outer rows of teeth having a greater height than the inner rows.

4. A pipe tong die comprising
an elongated body portion,
a plurality of longitudinally extending rows of exposed teeth provided on one face of the body,
a plurality of rubber spacers secured to the body adjacent the exposed teeth and extending beyond the outer limit of the height of the teeth for cushioning the initial shock of the die against the pipe upon actuation of the tongs,
said exposed teeth being of varying heights to compensate for the curvature of the outer periphery of the pipe,
and the outer rows of said exposed teeth having a greater height than the inner rows.

5. A pipe tong die comprising
an elongated body portion having diverging side edges to provide a substantially dove-tail configuration therefor,
a plurality of transversely spaced teeth provided on one face of the body portion and extending longitudinally therealong substantially parallel to the opposed side edges of the body portion,
the inwardly disposed teeth having heights of diminishing sizes with respect to the outer teeth whereby the crests of the teeth define a circle.

6. A pipe tong die comprising
an elongated body portion,
a plurality of spaced rows of exposed teeth provided on one face of the body portion,
the inwardly disposed teeth having heights of diminishing sizes with respect to the outer teeth whereby the crests of the teeth define a circle,
and rubber spacer pads secured to the body portion adjacent the exposed teeth and having a thickness greater than the maximum height of the teeth.

7. A pipe tong die element comprising
an elongated body portion,
a plurality of teeth provided on one face of the body portion and extending longitudinally therealong,
opposed outwardly extending flanges provided on the body portion,
and compressible spacer members provided on the said flanges and of a thickness greater than the depth of the teeth whereby the spacers extend beyond the outer limit of the crests of the teeth.

8. A pipe tong die element as set forth in claim 7 wherein the inwardly disposed rows of teeth are of a diminishing height with respect to the outer rows thereof whereby the crests of the teeth define a circle.

9. A pipe tong die element as set forth in claim 7 wherein the flanges and spacer members are of a general configuration conforming to the outer periphery of the pipe.

10. A pipe tong die element comprising
   an elongated body portion,
   a plurality of transversely spaced rows of teeth provided on one face of the body portion and extending longitudinally therealong,
   opposed outwardly extending flanges provided on the body portion,
   compressible spacer members secured to the flanges and of a thickness greater than the maximum height of the teeth whereby the spacers normally extend beyond the outer limit of the crests of the teeth,
   said flanges and spacer members being of a transverse configuration complementary to the outer periphery of the pipe,
   and the inwardly disposed rows of teeth being of a sequentially diminishing height with respect to the outer rows thereof whereby the crests of teeth define a circle.

References Cited by the Examiner

UNITED STATES PATENTS

| | | | |
|---|---|---|---|
| 590,710 | 9/97 | Sheppard et al. | 81—421 |
| 906,507 | 12/08 | Canedy | 269—279 |
| 977,896 | 12/10 | Nicholson. | |
| 1,382,492 | 6/21 | Evans. | |
| 2,098,369 | 11/37 | Baash | 81—186 |
| 2,493,556 | 1/50 | Stone. | |
| 2,534,616 | 12/50 | Milligan | 279—123 |
| 2,714,321 | 8/55 | Tamplin. | |
| 2,729,129 | 1/56 | Reese | 81—186 X |
| 2,766,649 | 10/56 | Labry. | |
| 2,788,216 | 4/57 | Chasar | 279—123 |
| 2,887,754 | 5/59 | Johnson | 24—263.5 |
| 2,971,565 | 2/61 | Jarund | 269—274 |
| 3,124,023 | 3/64 | Marquis et al. | 81—186 |

WILLIAM FELDMAN, *Primary Examiner.*

WALTER A. SCHEEL, *Examiner.*